(No Model.) 2 Sheets—Sheet 1.

H. MILLER.
SULKY PLOW.

No. 252,615. Patented Jan. 24, 1882.

WITNESSES
Fred. G. Dieterich
P. C. Dieterich

INVENTOR
Herman Miller,
by C. A. Snow & Co.
Attorneys

N. PETERS, Photo-Lithographer, Washington, D. C.

(No Model.) 2 Sheets—Sheet 2.
H. MILLER.
SULKY PLOW.
No. 252,615. Patented Jan. 24, 1882.
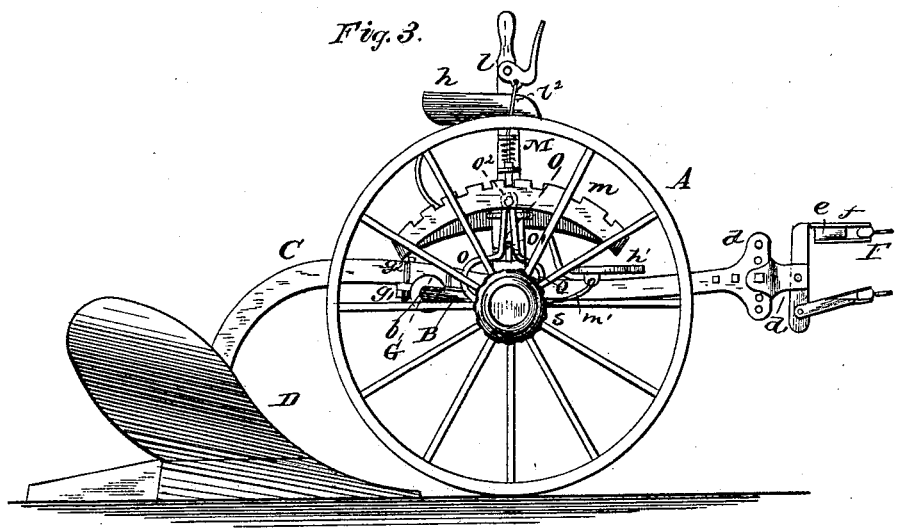
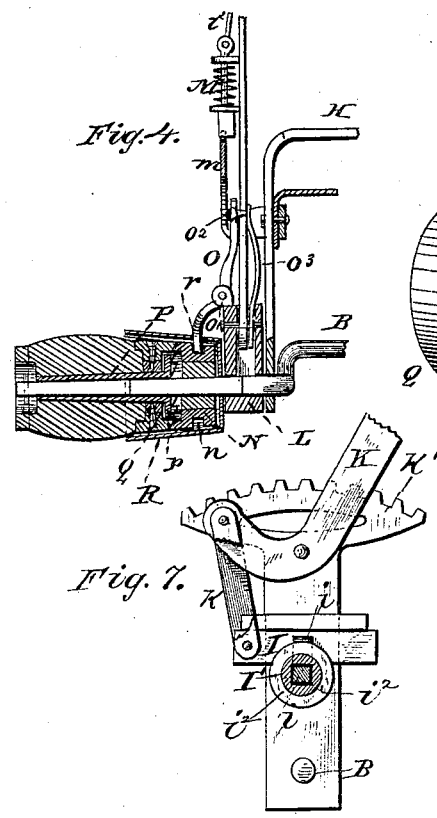
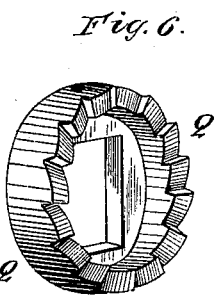
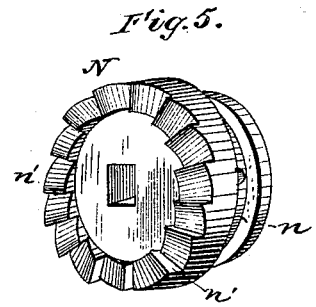
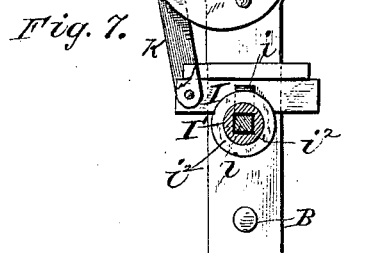
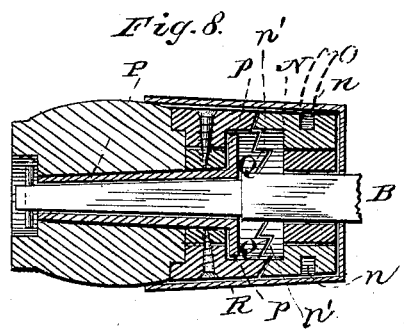
WITNESSES
Fred. G. Dieterich
INVENTOR
Herman Miller
by A. Snow and Co., Attorneys

UNITED STATES PATENT OFFICE.

HERMAN MILLER, OF NEW ULM, MINNESOTA, ASSIGNOR OF ONE-HALF TO M. MULLEN, OF SAME PLACE.

SULKY-PLOW.

SPECIFICATION forming part of Letters Patent No. 252,615, dated January 24, 1882.

Application filed October 15, 1881. (No model.)

*To all whom it may concern:*

Be it known that I, HERMAN MILLER, of New Ulm, in the county of Brown and State of Minnesota, have invented certain new and useful Improvements in Sulky-Plows; and I do hereby declare that the following is a full, clear, and exact description of the invention, which will enable others skilled in the art to which it appertains to make and use the same, reference being had to the accompanying drawings, which form a part of this specification.

My invention relates to sulky-plows; and it consists, first, in a device for connecting the plow-beam and axle; and, second, in means for locking the wheel, the lifting-lever being adapted to subserve two functions, all substantially as will be hereinafter more fully described, and particularly pointed out in the claims.

Figure 1:
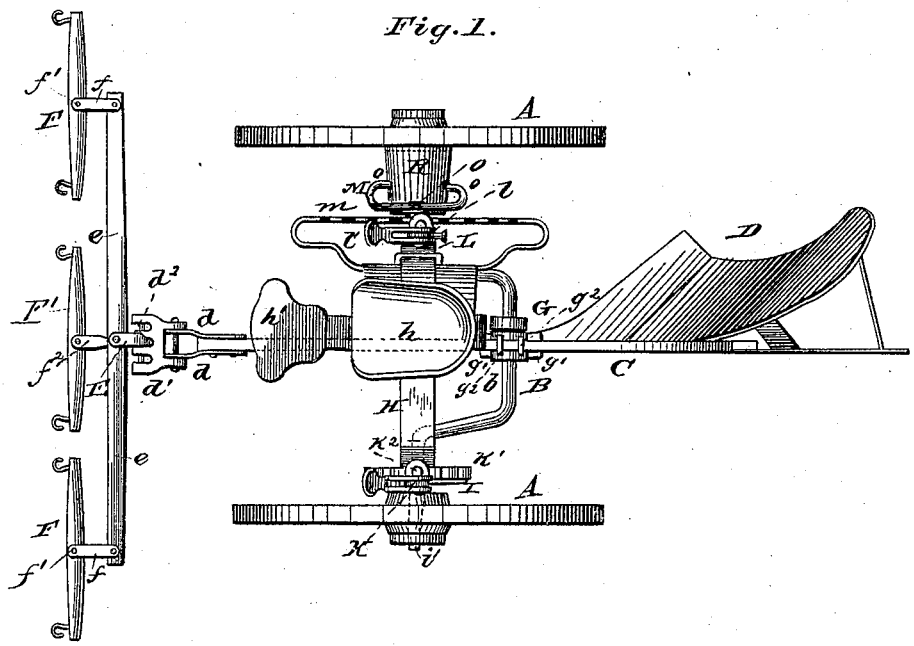
Figure 2:
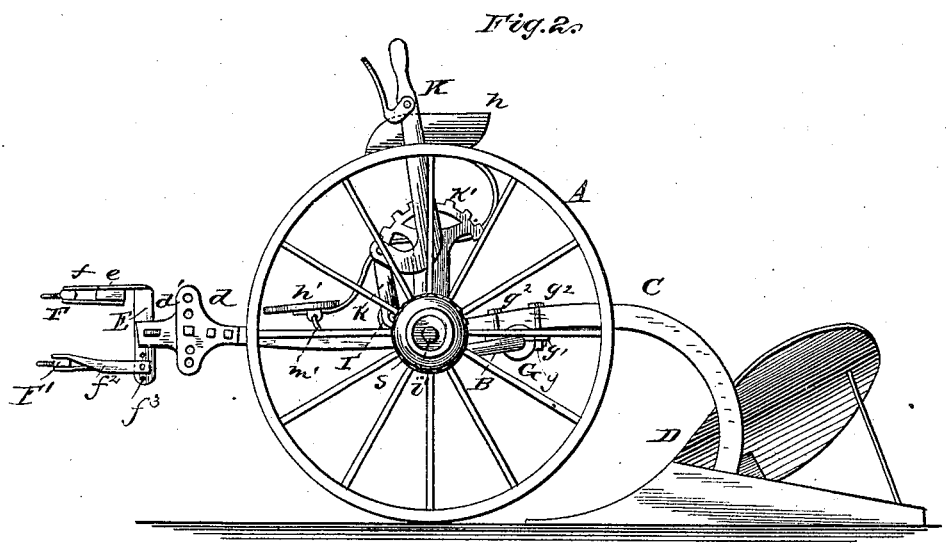

In the drawings, Figure 1 is a top or plan view; Fig. 2, a side elevation; Fig. 3, a like view of the opposite side; Fig. 4, a section through the lifting-lever, sand-cap, and devices inclosed by the latter. Fig. 5 represents the toothed and grooved disk, and Fig. 6 the toothed rim of the wheel-hub; and Figs. 7 and 8 are detail views.

A A are the two supporting-wheels, and B the axle, which is cranked so as to form the central bail, $b$. The plow-beam C, which crosses this bail, is curved downwardly at its rear end in order to form a standard for the plow D, arranged at the rear of the machine. The forward end of the plow-beam is provided with the two parallel metal plates $d\ d$, formed with coincident lines of perforations for receiving the coupling-pin, which connects the said plates with a clevis, $d'$. This clevis is formed with a set of notches, $d^2$, into any one of which will be received the short standard E, that is connected with the double-tree $e$. A pin passes through the notched portion of the clevis and engages the short standard, whereby by adjusting the standard in the series of notches to the right or left the line of draft can be varied. It will also be seen that the connection of the clevis with the plates at the end of the plow-beam, admits of a vertical adjustment of the clevis and double-tree.

The two outer single-trees, F F, are connected to the outer ends of the double-tree $e$ by plates $f$, secured by a pivot, $f'$, to the single trees F, while the central single-tree, F', is connected to the standard E, that is attached to the double-tree $e$ by similar plates, $f^2$, pivoted in a series of perforations, $f^3$, in the lower portion of the standard E, as shown, this last-mentioned feature being to raise or lower the single-tree F' as may be required.

The plow-beam is connected with the bail so as to turn thereon by means of a two-part hub, G, through which the arched portion of the axle passes. The upper part or half of this hub is formed with laterally-projecting lugs $g$ $g$, and it is grooved transversely to receive the plow-beam. The lower part or half of the hub is formed with lugs $g'$, these two parts of the hub, and also the plow-beam, being held firmly together by clips $g^2$, which embrace the lugs of the lower half of the hub and pass up through holes in the upper part of the hub.

H indicates the arch of the main frame, to which the support for the driver's seat $h$ and foot-rest $h'$ is secured. A brace-rod, $m'$, extends from the support for the foot-rest to a collar fixed upon the main axle, to which it is secured. The axle has its bearings in the lower ends of this arch, and upon one of its sides is arranged the sliding block I, to which one end of a short cranked axle, $i$, is secured. A skein, I', having a cap, $i^2$, is fitted upon this axle, and one of the wheels is arranged upon this skein or thimble.

A lever, K, is pivoted to the arch and connected by a strap or link, $k$, with the sliding block I, whereby the block can be raised or lowered in order to raise or lower this end of the machine, and thus level the plow. A sector-rack, $k'$, is secured to the arch, and a latch-lever pivoted to lever K is connected with a latch, $k^2$, for engaging the rack, so as to hold the parts in proper adjustment. At the opposite side of the arch H the main axle passes through its lower end, and instead of terminating at said end, as is the case at the first-described side of the arch, the axle extends some distance beyond the same, and has its part thus extended beyond said arch squared, so as to hold from turning the several devices which are fitted thereon, and which will now be described.

The first, and next to the side of the arch, is the rectangular socket-piece L, in which is pivoted the lifting-lever l for raising or lowering the plow. This lever carries the pivoted latch-lever l', connected by rod l² with the spring-latch M, said latch being adapted to engage the sector-rack m, that is secured to the arch of the main frame. The lever-block is rigidly secured to the axle, and when the lever is thrown forward or back the crank is turned and the plow raised or lowered in the usual manner. The lever is also arranged for another purpose, as will now be described.

Next to the socket-piece on the axle is arranged a hub or disk, N, formed with a circumferential groove, n, and with teeth n' upon its outer face. The two arms o o of a bent lever, O, attached to the lifting-lever, enter the groove of this disk. This bent lever is pivoted to a lug, o', on the socket-piece L, and its upper end is yieldingly connected with the lever by means of a stud, o², passing between the two arms o o of the bar or rod O, and secured to the lever. Hence by vibrating the lifting-lever in a plane at right angles to that in which it is turned to raise or lower the plow the bent rod O will be vibrated upon its pivot so as to shift the grooved and toothed disk along the axle. A spring, o³, connects with the lifting-lever and with the socket-piece, its function being to normally maintain the lever in line with the socket, and hence keep the toothed disk near to the socket-piece.

P represents an axle-skein, having at its inner and larger end an annular flange, p. This axle-skein is arranged next in order upon the axle, with its flange contiguous to the toothed face of the disk. The wheel is arranged to revolve upon this axle-skein, and the wheel-hub is provided with an inner toothed rim, Q, which can be cast solid with the hub, or which can be made separately and connected with the hub by means of a rectangular bushing in the latter entering a similar-shaped opening through the said rim-piece.

R is the sand band or cap, which has a closed inner end with an opening through the same for the squared axle. This cap has the two side openings, r r, for the arms o of the pivoted rod O to pass through.

By operating the lifting-lever against the spring as last described the inner toothed disk will be moved outwardly so as to engage the toothed rim of the hub, and thus lock the wheel and axle together and prevent the former from turning, when the raising of the plow will be effected by the draft of the team.

The wheel-hub is made of metal and in wavy or serpentine form, as at S S, whereby the spokes can be spread out into two lines at their lower ends, and the wheel-hub made light and strong with the minimum amount of metal.

Having thus described my invention, what I claim is—

1. As an improvement in sulky-plows, the combination, with the axle and plow-beam, of the device for securing them together, consisting substantially of the two-part hub G, encircling the axle, the upper half of which is formed with laterally-projecting lugs g g, and is grooved transversely to receive the plow-beam, and the lower half with similar lugs, g', all being held securely together by clips g², which embrace the lugs, substantially as and for the purpose herein shown and specified.

2. The combination of the lever l with the sliding toothed hub N upon the axle, the bent rod O, pivoted and engaging said hub, the axle-skein P, flanged at its inner end, and the wheel with the toothed hub-rim, said members being constructed and organized substantially as and for the purpose described.

3. The combination, with the toothed hub N, axle-skein P, toothed hub-rim, and rod O, of the sand-cap R, provided with openings for the lower arm of said rod, and arranged to cover the said parts, substantially as described.

In testimony that I claim the foregoing as my own I have hereto affixed my signature in presence of two witnesses.

HERMAN MILLER.

Witnesses:
JAMES McKITTRICK,
CHARLES STOLL.